US006507999B1

(12) United States Patent
Kaibyshev et al.

(10) Patent No.: US 6,507,999 B1
(45) Date of Patent: Jan. 21, 2003

(54) METHOD OF MANUFACTURING INTERNAL COMBUSTION ENGINE PISTONS

(75) Inventors: Oscar Akramovich Kaibyshev, Ufa (RU); Vadim Gennadievich Trifonov, Ufa (RU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/914,630

(22) PCT Filed: Mar. 10, 2000

(86) PCT No.: PCT/US00/06238

§ 371 (c)(1), (2), (4) Date: Aug. 30, 2001

(87) PCT Pub. No.: WO00/53914

PCT Pub. Date: Sep. 14, 2000

(30) Foreign Application Priority Data

Mar. 12, 1999 (RU) .......................................... 99105048

(51) Int. Cl.[7] ................................................ B23P 15/00

(52) U.S. Cl. ........................... 29/888.044; 29/888.048; 29/888.042

(58) Field of Search ....................... 29/888.04, 888.042, 29/888.047; 148/437; 92/208; 123/193.6; 72/377, 462

(56) References Cited

U.S. PATENT DOCUMENTS

| | | | | |
|---|---|---|---|---|
| 4,721,537 A | | 1/1988 | Ghosh | |
| 4,762,679 A | | 8/1988 | Gegel et al. | |
| 4,973,363 A | * | 11/1990 | Hayato et al. | 148/417 |
| 5,826,456 A | | 10/1998 | Kawazoe et al. | |
| 5,851,320 A | * | 12/1998 | Auran et al. | |
| 5,992,015 A | * | 11/1999 | Kurita et al. | 29/888.042 |
| 6,032,570 A | * | 3/2000 | Koike et al. | 92/222 |
| 6,240,827 B1 | * | 6/2001 | Koike et al. | 92/213 |

FOREIGN PATENT DOCUMENTS

| | | |
|---|---|---|
| EP | 739661 | 10/1996 |
| GB | 2300198 | 10/1996 |

* cited by examiner

*Primary Examiner*—I. Cuda-Rosenbaum
(74) *Attorney, Agent, or Firm*—Noreen C. Johnson; Phillip D. Freedman

(57) ABSTRACT

A piston production method produces an internal combustion engine piston. The method comprises forging a billet from an initial billet comprising an aluminum alloy that comprises silicon, intermetallic particles, and injected hardening particles, the forging is conducted under at least one of super-plasticity and hot deformation conditions; and heat treating the forged billet. The forging comprises forging at a temperature in a range from about 0.8 $T_{melt}$ to about 0.98 $T_{melt}$. The forging also comprises forging at a STRAIN rate in a range from about $5\times10^{-2}$ $s^{-1}$ to about $5\times10^{-5s}$ $^{-1}$. The piston being formed with a configuration that enables other as parts to be connected to the piston. The initial billet comprises at least one of: coarse grain silicon, intermetallic particles, and injected hardening particles having at least one of a lamellar, comprehensive shape, and fine grain silicon, intermetallic particles, and injected hardening particles being globular in shape. The silicon, intermetallic and injected hardening particle volume content is in a range from about 25% to about 60%, and an average grain size of the silicon, intermetallic, and injected hardening particles is less than about 15 $\mu m^2$.

30 Claims, 9 Drawing Sheets

X400

METHOD OF MANUFACTURING INTERNAL COMBUSTION ENGINE PISTONS

This is a application of International Application No. PCT/US00/06238 filed Mar. 20, 2000.

BACKGROUND OF THE INVENTION

This invention is relates to the manufacture of internal combustion engine pistons, such as, but not limited to, internal combustion engine pistons used in automobiles engines, treaded or crawler-type machinery, aeronautical engines, and marine based motors.

A piston is typically a highly-stressed engine component. While a piston is in motion, the top or crown of the piston may be subjected to high temperatures. Any grooves formed in the piston, for example grooves for compression rings, may be subjected to high impact stresses. Additionally, if the piston comprises a wrist pin port, the port may be subjected to adverse cyclical loads. These piston features undergo varying operational stresses, loads, temperatures, and other operation characteristics (hereinafter "operational characteristics") and may lead to different piston areas needing different mechanical attributes and qualities (also known as "piston characteristics") to endure these operational characteristics.

A piston's mechanical attributes may be determined by its properties. Pistons, such as, but not limited to, engine internal combustion pistons, often comprise aluminum alloys. These aluminum alloys include, but are not limited to, silumins, which can possess a silicon content in a range from about 11% to about 35%. Additionally, if the piston comprises silumin alloy-based compounds, the piston may also comprise hardening agents, such as silicon carbides (SiC) and aluminum oxides ($Al_2O_3$) The silicon and intermetallic particles in the alloys, in combination with the above agents, may enhance a material's heat resistance and wear properties. However, a material's resistance to metal fatigue and plasticity may decrease with the enhancement of its heat resistance and wear properties.

If a piston's base materials do not provide it with desired properties, piston areas that may undergo stress can be formed from a material that can be hardened. The hardening may be conducted by incorporating at least one of ferrous-based alloy and ceramic materials. For example, a piston portion may include an ironholder, which is generally recognized as heat resistant that can reduce a compression ring groove wear. This piston portion can be reinforced by plasma-arc welding and injecting alloying constituents, such as nickel, iron, and other such reinforcing constituents, into the piston. The heat resistant nature of these materials protects the piston.

Piston design and production may depend on the desired application of the piston. For example, pistons can be formed by casting, as set forth Yu, et al. "Aluminum Alloys in Tractor Building", Machine Building, 1971. This casting method provides a relatively efficient and low cost production method, which permits casting of pistons with reinforcements thereon. These reinforcements include, but not limited to, piston ring holders and brackets. However, these aluminum-cast pistons are generally used in low dynamic loads (pressures) applications because the aluminum-cast pistons can only be subjected to low mechanical stress levels.

Another known piston production process comprises hot-deformation forging from an aluminum alloy billet, as disclosed in Yu et al., "Isothermal Forging of Pistons from an Alloy", Forging Production, 1979. This forging method may be more expensive than a casting method, however, forging silumin-alloy pistons can provide enhanced mechanical properties. Thus, these silumin-alloy pistons can be used in applications that undergo powerful loads. The forging method typically is conducted for small and relatively simple pistons because of silumin's low plasticity under hot-deformation forging conditions. Therefore, reinforcements are added to overcome this plasticity deficiency, for example brackets can be added by being mounted on a piston. This reinforcement can complicate a piston's design and increase its production costs. Further, the forging method may be limited by forging temperatures that do not provide a desired quantity and size of the silicon and other hardening particles in the silumin-alloy. Therefore, known forging processes may, prevent an silumin-alloy piston from achieving-desired plasticity and mechanical properties. Therefore, a need exists for a piston production method that can produce pistons with desired plasticity and mechanical properties. Further, a need exists for a piston production method that overcomes the above-noted deficiencies. Also, a need exists for a piston production method for producing silumin-alloy pistons.

SUMMARY OF THE INVENTION

A piston production method produces an internal combustion engine piston. The method comprises forging a billet from an initial billet comprising an aluminum alloy that comprises silicon, intermetallic particles, and injected hardening particles, the forging is conducted under at least one of super-plasticity and hot deformation conditions; and heat treating the forged billet. The forging comprises forging at a temperature in a range from about 0.8 $T_{melt}$ to about 0.98 $T_{melt}$. The forging also comprises forging at a strain rate in a range from about $5\times10^{-2}$ $S^{-1}$ to about $5\times10^{-5}$ $s^{-1}$. The piston being formed with a configuration that enables other parts to be connected to the piston. The initial billet comprises at least one of: coarse grain silicon, intermetallic particles, and injected hardening particles having at least one of a lamellar, comprehensive shape, and fine grain silicon, intermetallic particles, and injected hardening particles being globular in shape. The silicon, intermetallic and injected hardening particle volume content is in a range from about 25% to about 60%, and an average grain size of the silicon, intermetallic, and injected hardening particles is less than about 15 $\mu m^2$.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIGS. 7–12 are schematic illustrations of composite piston being forged by a process, as embodied by the invention, in which FIG. 7 illustrates a cup-shaped inner case; FIG. 8 illustrates a cup-shaped outer piston case: FIG. 8 illustrates fitting an inner case into an outer case; FIG. 9 illustrates a compound piston after forging; FIG. 10 illustrates a washer-shaped outer case and a cup-shaped inner case; and FIG. 12 illustrates washer-shaped inner and outer cases;

DESCRIPTION OF THE INVENTION

A piston production method and its associated system, as embodied by the invention, enables pistons comprising silumin alloy to be produced. The piston production method can form pistons by forging. The silumin-alloy pistons that are produced by forging, as embodied by the invention, comprise varying mechanical properties and characteristics combined in one piston. These mechanical properties and characteristics may be further dependent upon a silumin-alloy piston's initial configuration and microstructure. Also, mechanical properties and characteristics may be dependent upon a silumin-alloy piston's configuration and microstructure produced by deformation treatments in the piston production method, as embodied by the invention.

Figure 1:
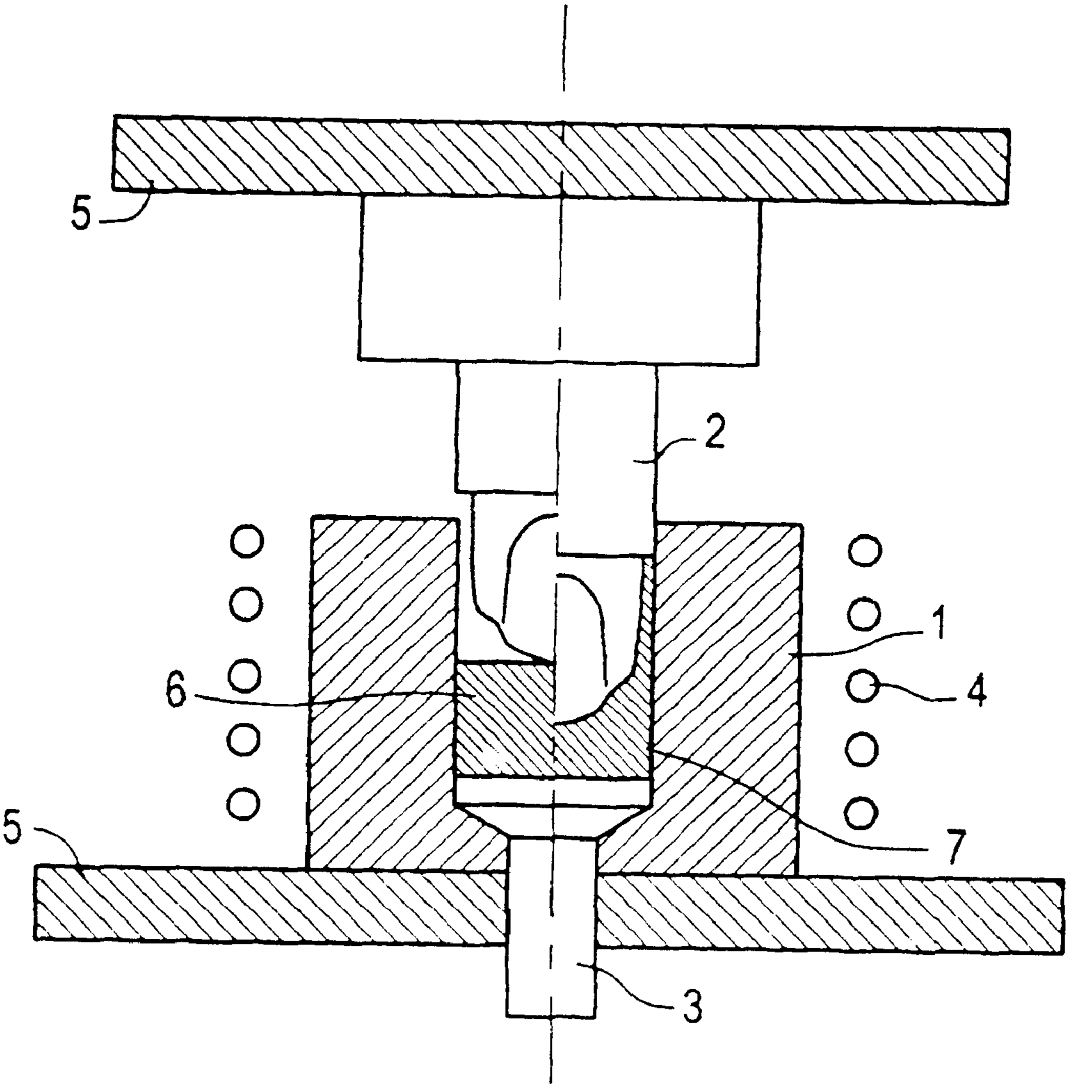
FIG. 1 is a schematic illustration of piston production system, and method in which the left side of the axis is before deformation occurs, and the right side of the axis is after deformation has occurred.
Figure 2:
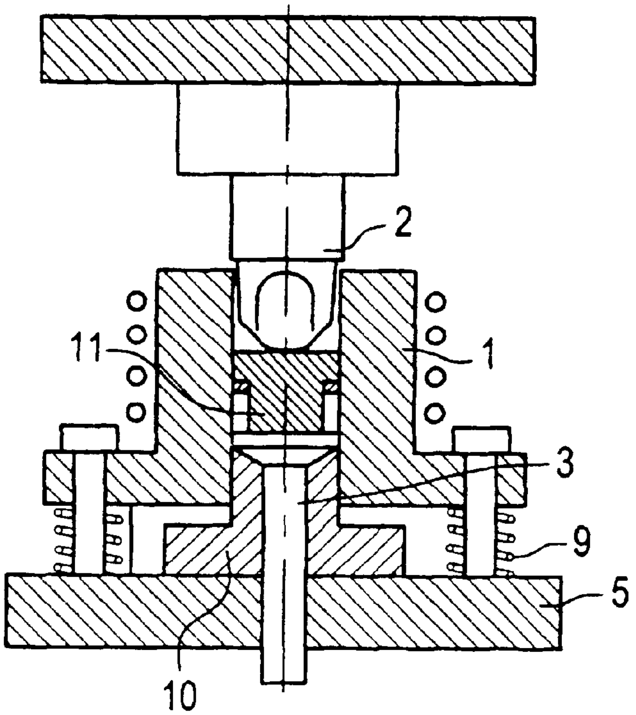
FIG. 2 is a schematic illustration of piston in a ring holder production system with a billet and ring holder in a piston die.
Figure 3:
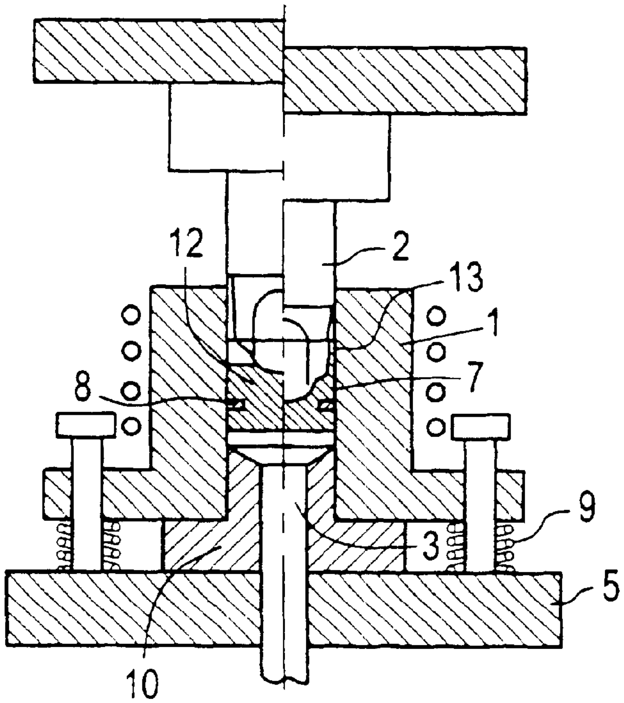
FIG. 3 is a schematic illustration of piston in a ring holder production system with the forging of the piston crown on left side of the axis, and pith the forging of the piston inner part on the right side of the axis.
Figure 4:
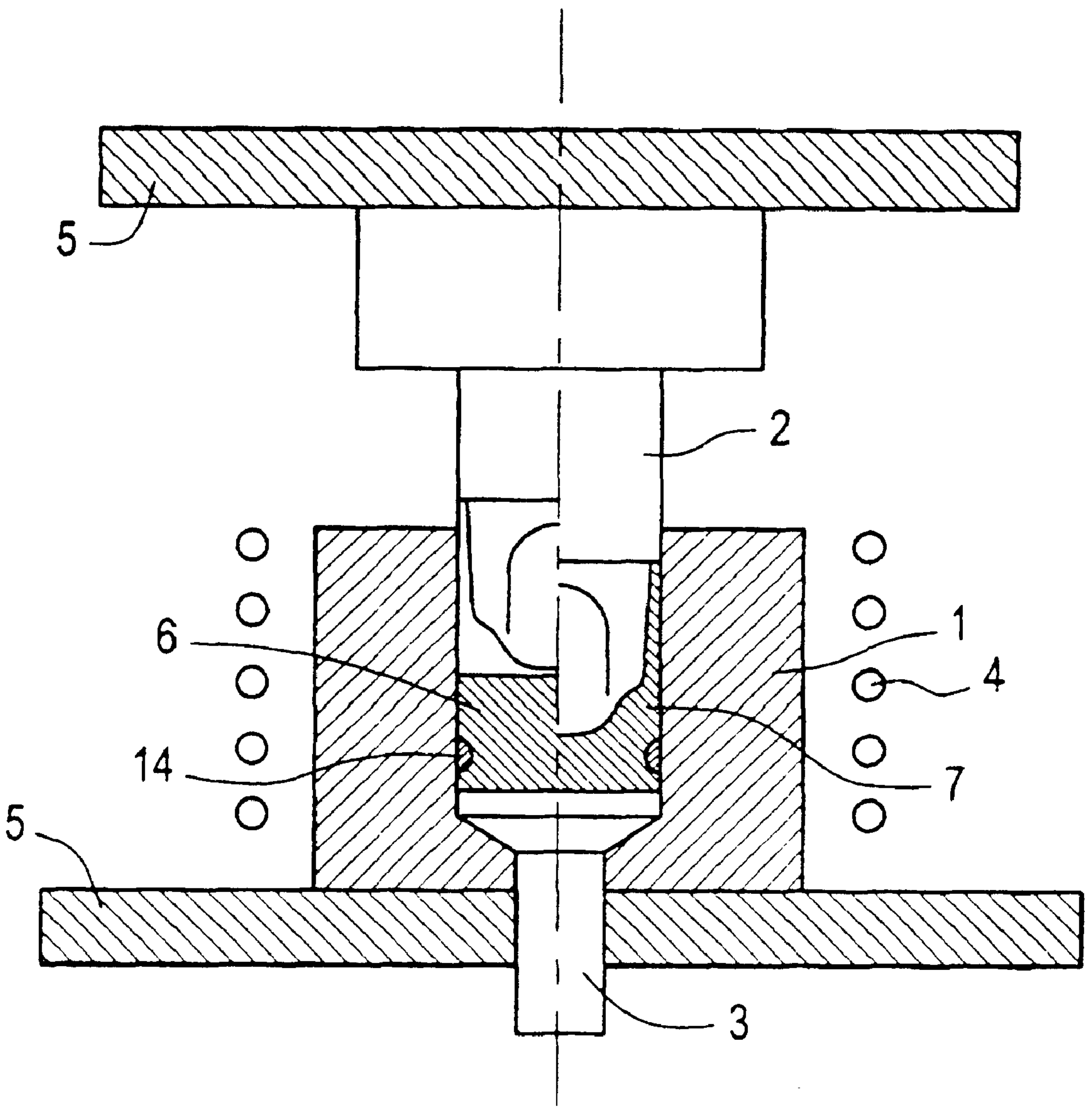
FIG. 4 is a schematic illustration of fused piston production system, in which the left side of the axis illustrates before deformation, and the right side of the axis illustrates after deformation.
Figure 5:
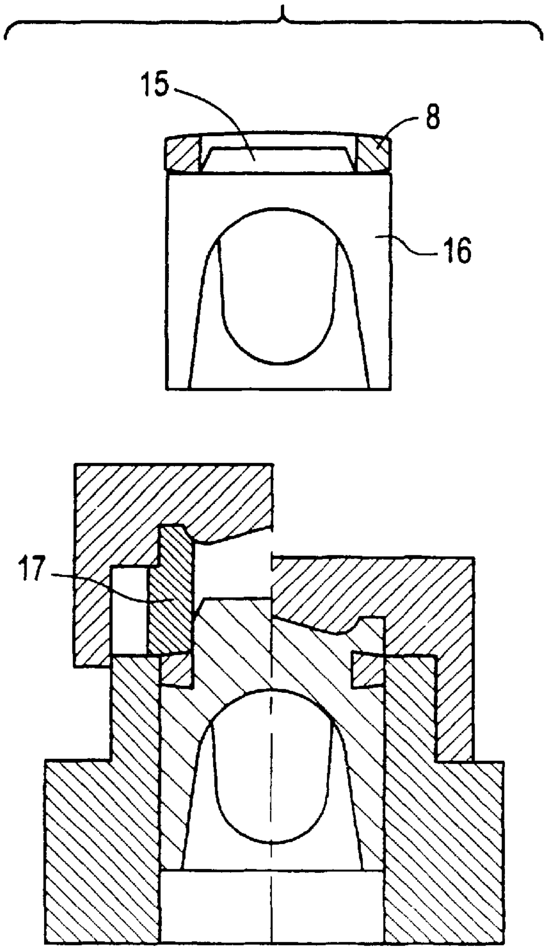
FIG. 5 is an exploded schematic illustration of pressing a ring holder.

The piston production method, as embodied by the invention, is schematically illustrated with the piston die system of FIG. 1. In FIG. 1. the piston die system comprises a piston die matrix 1, a piston die 2, a pusher 3, a heater element 4, at least one liner plate 5, a billet 6, and forged piston 7. FIG. 2 also illustrates features of the piston die system and related structures for the piston production method, as embodied by the invention. FIG. 2 illustrates a ring holder 8, a spring 9, a piston die matrix guide 10, a piston billet with ring groove 11, a piston blank, ring holder, and crown 12, and a piston comprising a ring holder 13. FIG. 3 illustrates fused material 14 that has been formed by a piston production method, as embodied by the invention.

Further features of the piston die system and related structures are illustrated in the remainder of the figures. These features include an aligning flange 15, a partially formed billet inner part 16, a ring 17, a band-shaped ring holder 18, a cup-shaped billet outer case 19, a cup-shaped billet inner case 20, a washer-shaped outer billet case 21, and a washer-shaped inner billet case 22.

The silumin-alloy piston production method, as embodied by the invention, can produce silumin-alloy pistons by forging fully formed pistons including structural reinforcements features (hereinafter "reinforcements"). The reinforcements comprise, but are not limited to, ring holders and piston brackets. The piston production method, as embodied by the invention, can be used to form pistons of varying sizes, for internal combustion engines, such as pistons used in automobiles, aeronautical and marine applications, and large treaded machinery. The piston production method, can increase piston production efficiency by providing pistons with mechanical properties and characteristics that meet those desired mechanical properties and characteristics for an intended application.

The piston production method, as embodied by the invention, comprises forging a billet, which can comprise an aluminum alloy composition. The aluminum alloy composition comprises at least one of silicon, intermetallic particles. and injected hardening particles. The following description of the invention will describe an aluminum alloy composition as set forth above, however other compositions are within the scope of the invention. The particles can be provided in a lamellar configuration. The composition for the initial billet, for example an aluminum alloy composition, may also comprise at least one of fine silicon, intermetallic particles, and injected hardening particles. The injected hardening particles can be generally globular in configuration.

The forging step of the piston production method can be followed by a heat treatment step. In the piston production method, as embodied by the invention, the forging can produce large-sized pistons and pistons that comprise reinforcements. The piston production method also permits pistons to be formed with a configuration that enables piston components to be readily connected with the piston. The forging is typically conducted in a temperature range from about 0.8 $T_{melt}$ to about 0.98 $T_{melt}$ of the piston material. The forging of the piston production method is generally conducted with a strain rate of in a range from about $5\times10^{-2}s^{-1}$ to about $5\times10^{-2}s^{-1}$.

The piston production method may also comprise forging steps that are conducted under super-plasticity or common hot deformation conditions. These conditions are generally provided if at least one of silicon, intermetallic particles, and injected hardening particles have a volume content in a range from about 25% to about 60% of the aluminum alloy composition, with an average grain size of silicon. intermetallic particles, and injected hardening particles less than about 15 $\mu m^2$. If the billet material composition includes a particle content and size that is outside of the above ranges, forging may be conducted under hot deformation conditions. Thus, a larger a silicon or particle size can provide forging steps with a lower strain rate. For example, forging with a strain rate in a range from about $10^{-3}s^{-1}$ to about $5\times10^{-5}s^{-1}$. and a lower forging temperature range, for example a temperature range from about 0.83 $T_{melt}$ to about 0.89 $T_{melt}$ can be conducted.

Billet material composition and configuration characteristics can be considered in determining piston production method parameters. For example, if a billet material composition comprises a particle weight content that is greater than about 20% and an average grain size that is greater than about 15 $\mu m^2$, the initial billet configuration and the disposing of a billet into a forging device can be considered for piston production. These billet material composition and configuration characteristics may decrease deformation that occurs during a piston production method, as embodied by the invention. The piston production method, which can include forging, as described above, may comprise a one-step process. The piston production method that includes a one-step process can be conducted under hot deformation and super-plasticity conditions.

Alternatively, the piston production method can be conducted in a temperature range from about 0.90 $T_{melt}$ to about 0.98 $T_{melt}$ and at strain rate in a range from about $5\times10^{-2}s^{-1}$ to about $10^{-3}s^{-1}$. These temperature and strain rate ranges are employed with a piston production method that uses billet material composition comprising at least one of silicon, intermetallic particles, and injected hardening particles with an average grain size that is less than 6 $\mu m^2$. In the piston production method of a billet with such a billet material composition, the billet can undergo primary deformation before forging steps. The primary deformation can occur in a temperature range from about 0.79 $T_{melt}$ to about 0.86 $T_{melt}$ and in a strain rate range from about $5\times10^{-4}s^{-1}$ to about $5\times10^{-3}s^{-1}$.

Alternatively, the piston production method, as embodied by the invention, can form pistons from a billet that comprises a billet material composition with at least one of average grain sized silicon, or intermetallic particles, and injected hardening particles with a size that is in a range from about 6 $\mu m^2$ to about 15 $\mu m^2$. The parts per million (ppm) for this billet material composition can comprise hot deformation forging that is conducted in a temperature range from about 0.84 $T_{melt}$ to about 0.96 $T_{melt}$ and in strain rate range from about $10^{-3}s^{-1}$ to about $5\times10^{-4}s^{-1}$.

Further another alternative of the piston production method, as embodied by the invention can form pistons a billet that comprises at least one of silicon, intermetallic particles, and injected hardening particles with an average grain size less than about 15 $\mu m^2$, and where the injected hardening particles have a generally globular configuration. In this aspect of the piston production method, as embodied by the invention, a volume percent of silicon particles, intermetallic particles, and the injected hardening particles is in a range from about 25% to about 60%. With such a billet material composition, the piston production method comprises forging conducted under super-plasticity conditions in a temperature range from about 0.88 $T_{melt}$ to about 0.98 $T_{melt}$ and in strain rate range from about $5\times10^{-5}s^{-1}$ about $1\times10^{-1}s^{-1}$.

Furthermore, the piston production method can form pistons from a billet that has a billet material composition comprising at least one of silicon, intermetallic particles, and injected hardening particles with volume less than about 15% of the total billet mass. This piston production method, as embodied by the invention, can use the billet material that can be provided with a generally tapered cone configuration. The billet, which can be a casting, comprises a billet material composition with a configuration that contact of the billet and the piston die matrix is achieved only by side surface, that is more than about 30% of its area.

A gap distance that can occur in the piston production method between a billet's lower butt end and a piston die matrix base. The gap distance can be determined by the billet material configuration. For example, the gap distance can be determined with respect to the size and content of at least one of the silicon particle, intermetallic particles, and hardening particles. This gap distance is generally is equal to:

$$h=dK/C\sqrt{F}$$

where d is an internal diameter of the bottom of the piston die matrix, (mm): C is a content of at least one of silicon, intermetallic particles, and hardening particles injected, (% for mass); F is an average area of at least one of silicon particle, and intermetallic particles, and injected hardening particles ($\mu m^2$); and K is a coefficient that is reflective of the shape and size of a forging piston die-bit and is typically provided in a range from about 0.5 to about 10. Therefore, with a billet that comprises an average grain size of silicon, intermetallic particles, and injected hardening particles that is less than about 15 $\mu m^2$, any deformation is generally at a certain temperature essentially equal to a quenching temperature. Any quenching cooling that is immediately after the deformation process can complete the piston production method.

If a billet comprises average grain size of silicon, intermetallic particles, and injected hardening particles less than 15 $\mu m$ , and contains less than 15% silicon particles, intermetallic, and injected hardening particles, a ring holder can be made from alloys containing about 20% to about 45% by volume silicon, intermetallic particles, and injected hardening particles, with a size of 20 $\mu m^2$. In addition, a ring holder for the piston production method, as embodied by the invention, can be mounted with an interference fit on a piston side and against a butt end of a piston die matrix surface. Thus, any hot deformation forging can be conducted and may result in a piston crown being shaped first followed by an inner part.

The piston production method, as embodied by the invention, can be used with a billet material composition that comprise silicon, intermetallic particles, and injected hardening particles with an average rain size are less than about 15 $\mu m^2$ and a volume in a range from about 25% to about 60%. In this combination, a ring holder comprising an alloy having silicon, intermetallic, and injected hardening particles with an average size less than 20 $\mu m^2$ and in a volume range from about 20% to about 45% can be used. If the ring holder is mounted with an interference fit on a piston side and disposed against a butt end of the piston, the forging steps can be conducted under super plasticity conditions. Therefore, the piston crown can be shaped followed by shaping of an inner part of the piston.

A billet that comprises silicon, intermetallic particles, and injected hardening particles with an average grain size are less than about 15 $\mu m^2$ and that contains less than about 15% silicon, intermetallic, and injected hardening particles, can use a ring holder made from pig-iron or steel. Additionally, a ring holder can be mounted with an interference fit on a side and against a butt end of the piston die matrix in the piston for such billet. Any forging of the piston in the piston production method, as embodied by the invention, can be conducted under super plasticity conditions. Therefore, the piston crown can be shaped first and then followed by shaping of the inner part of a piston.

A billet that comprises silicon, intermetallic particles, and injected hardening particles with an average grain size less than about 15 $\mu m^2$ and that contains silicon, intermetallic, and injected hardening particles in a range from about 25% to about 60%, can use a ring holder made from pig-iron or steel. Additionally, a ring holder can be mounted with an interference fit on a side and against a butt end of the piston die matrix in the piston for this type of billet. Any forging of the piston in the piston production method, as embodied by the invention, can be conducted under super plasticity conditions. Therefore, the piston crown can be shaped first and then followed by shaping of the inner part of a piston.

Another aspect of the invention can provide aligned surfaces of a ring holder and piston's body billet that comprise a conical shape. The conical shape may comprise an angle in a range from about 1° to about 10°. The body's billet can be made with a ring shoulder having a negative angle in a range from about 1 to about 3°. The ring holder can be placed into a ring shoulder with an interference fit size in a range from about 0.1 mm to about 0.2 mm in diameter. The positioning of the ring holder is generally conducted at room temperature in the piston production method, as embodied by the invention.

The piston production method that comprises forging can be conducted in two steps. First, the forging can comprise placing a ring holder in a piston die matrix. The placing step can be followed by providing an interference fit between the ring holder's outer surface and an inner surface of the piston die matrix. The interference fit can be calculated as follows:

$$1.0017 \leqq d/D \leqq 1.0035$$

where d is a ring holder outer diameter at a forging temperature, and D is a piston die matrix inner diameter at the forging temperature. The forging can be conducted by physically moving the piston die matrix in the forging direction with the ring holder being fixed during any subsequent piston crown forging.

The ring holder in the piston production method, as embodied by the invention, can be coated with a layer of an aluminum-containing alloy. The coating and piston case can be made from essentially the same composition.

Two billets can be used to forge a piston with an inner and outer case by the piston production method, as embodied by the invention. For example, and in no way limiting of the invention, a billet for the piston production method can comprise about 15% (total) silicon, intermetallic particles, and injected hardening particles. This billet can be used to make a piston outer case. Another exemplary billet material composition comprises about 15% (total) silicon, intermetallic particles, and injected hardening particles. This billet material composition can be used to make a piston inner case, in which the outer case can be mounted by an interference fit to a side surface of the piston.

The piston production method, which comprises forging of two billets, can use a billet having an exemplary billet material composition with about 45% to about 60% (total) silicon, intermetallic particles, and injected hardening particles by volume. This billet material composition can be used to make the piston outer case. An exemplary billet material composition comprises a range of about 25% to about 40% (total) silicon, intermetallic particles, and injected hardening particles by volume can be used to make the piston inner body. While forging such a piston, the piston die can be heated to a temperature that enhances deformation of an inner billet, such as under super plasticity conditions. The piston die matrix can be heated to a temperature that enhances deformation of the outer billet under super plasticity conditions. Further, this piston production method can use billets that are generally washer shaped. Alternatively, piston production method, which comprises forging of two billets, can use billets that are cup-shaped with an outer cup-shaped billet comprising a taper to a butt end of the billet. In the piston production method, which comprises forging of two billets, pressing an inner cup into an outer cup can complete an assembly of a compound billet, as embodied by the invention.

Figure 6:
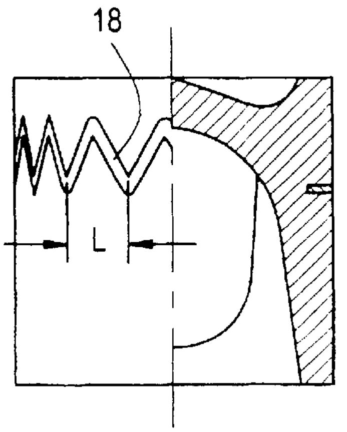
FIG. 6 is a schematic illustration of band-shaped piston with a ring holder.
Figure 7:
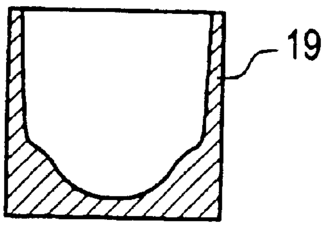
Figure 8:
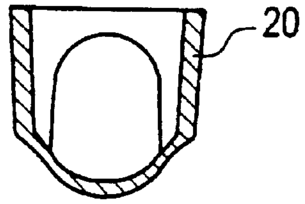
Figure 9:
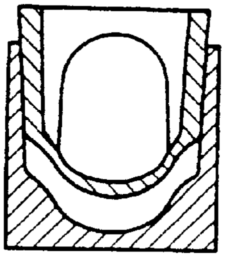
Figure 10:
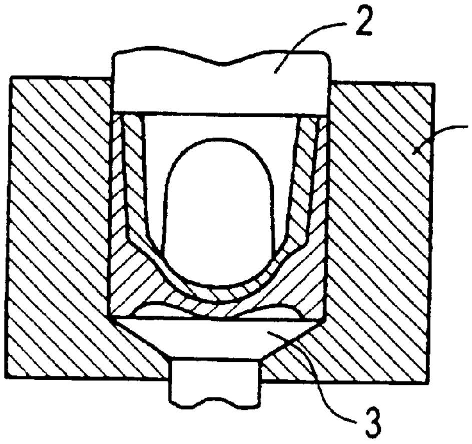
Figure 11:
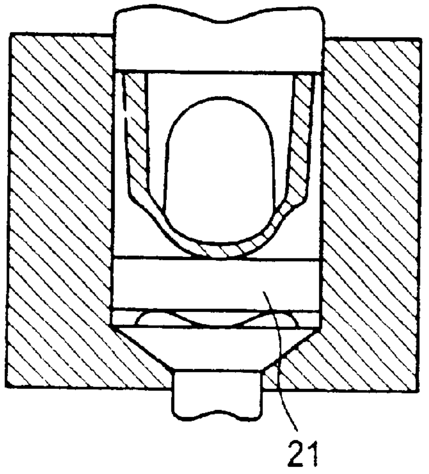
Figure 12:
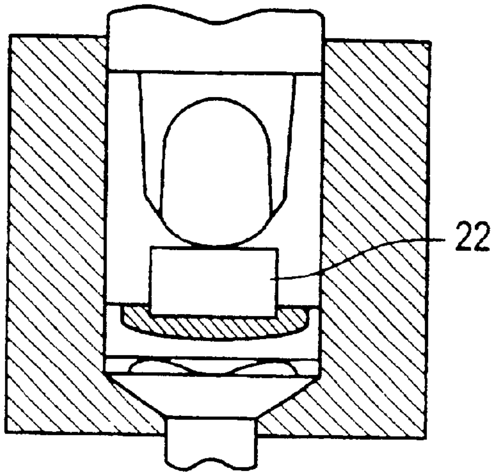
Figure 13:
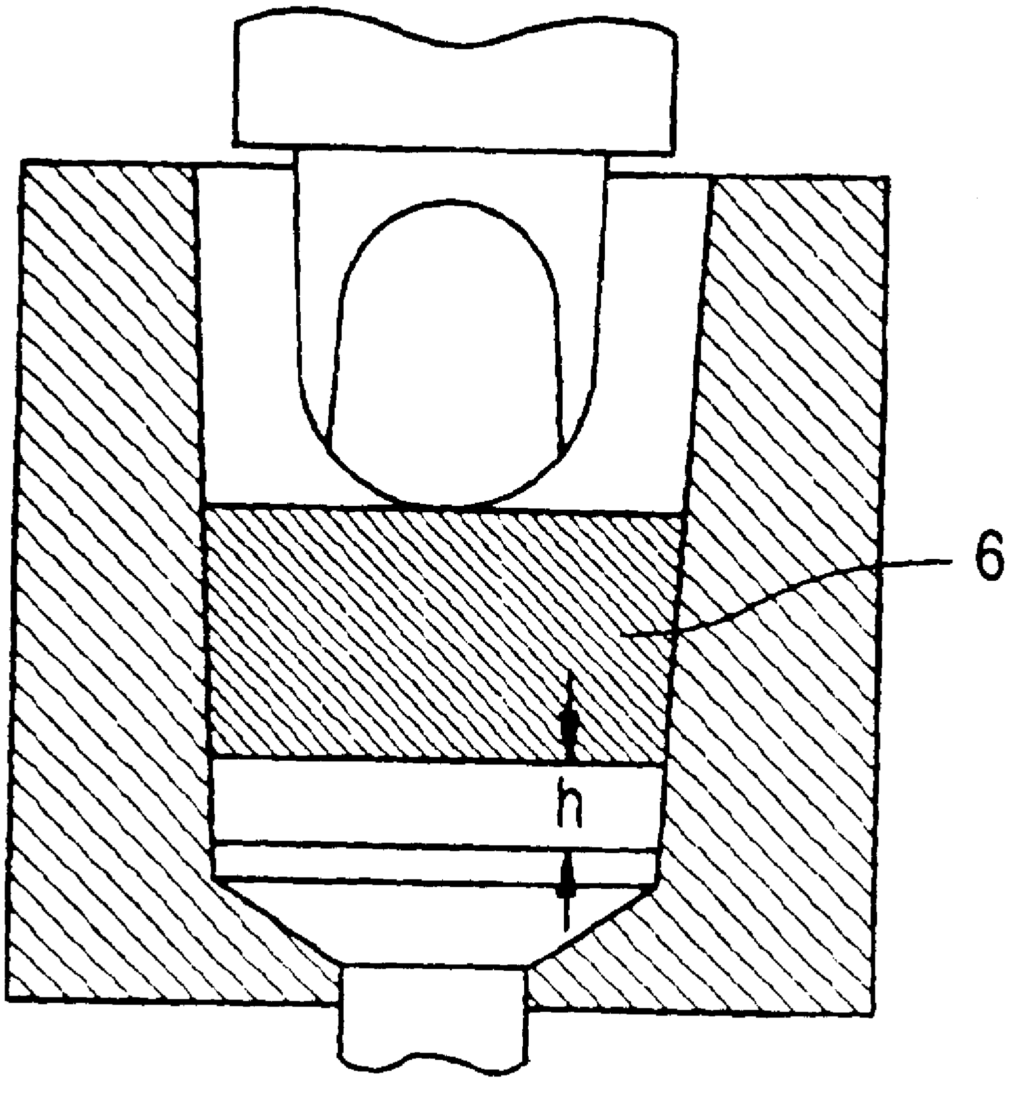
FIG. 13 is a schematic illustration of a billet being fit into a piston die, as embodied by the invention.
Figure 14:
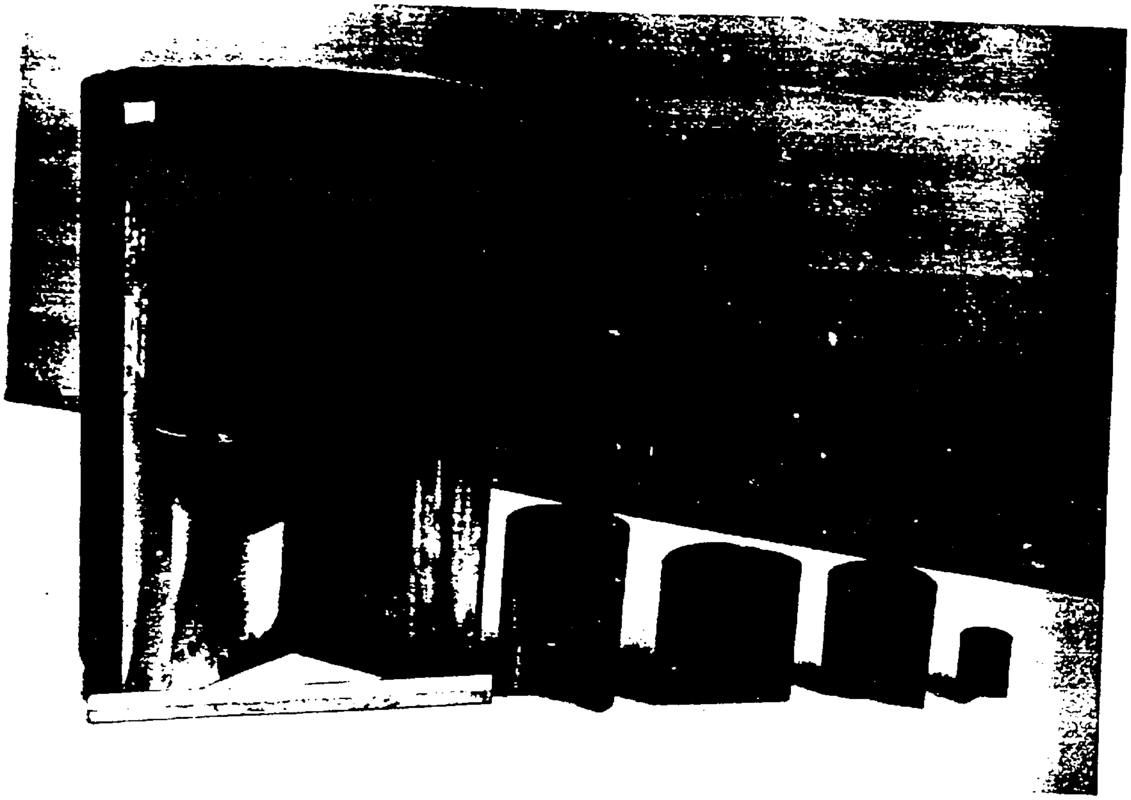
FIG. 14 is a photograph of various sized billets as produced by the piston production method, as embodied by the invention.
Figure 15:
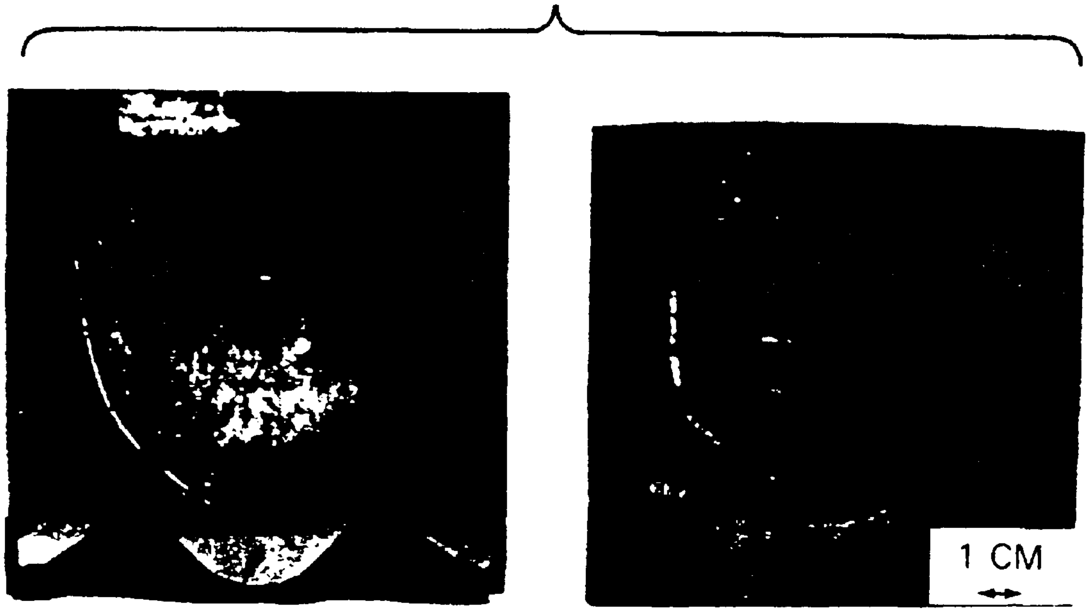
FIG. 15 is a photograph of cross-sectional pistons with brackets, as embodied by the invention.
Figure 16:
FIG. 16 is a photograph of a silumins microstructure with silicon and intermetallic particles having a size less than about 6 $\mu m^2$.
Figure 17:
FIG. 17 is a photograph of a silumins microstructure with silicon and intermetallic particles sized less particles having a size greater than about 15 $\mu m^2$.

The billet for the piston production method, as embodied by the invention, can include a protuberance, shoulder, or other extension. The shoulder's surface can comprise a wave-shaped surface, with a wave period L (FIG. 6). A billet material composition with an increase of silicon, intermetallic, particle size, and injected hardening particles may result in an increase in wave period L. For example, the piston production method, as embodied by the invention, can further employ a steel washer, spacer, or other separating device. The spacer can be placed on the shoulder's surface. The washer's thickness Generally satisfies the following condition:

$$L1=4\text{–}42.$$

Additionally, a relationship between the billet's height and shoulder can be determined so that a wave-shaped washer can be on a same general level at the piston's compression ring groove when forging is complete.

A billet with silicon, intermetallic particles, and injected hardening particles having an average grain size less than about 15 $\mu m^2$ can be placed in a piston die matrix against a bracket, in which the bracket mirrors a billet's surface. This orientation results in a lock joint being formed after the piston has been forced, for example forged using hot deformation. The bracket surface area S that is created in the formed lock joint can be determined by the formula:

$$S=KP/\text{Sin } \alpha F,$$

where P is a separation force required to overcome a dynamic force created during motor performance; K is a reliability coefficient; F is a aluminum alloy flow resistance at a working temperature; and a is an angle between a shoulder and a piston movement direction.

Alternatively, a billet with silicon, intermetallic particles, and injected hardening particles having an average grain size less than about 15 $\mu m^2$ and that comprises a total volume content of silicon, intermetallic, and injected hardening particles in a range between about 25% and about 60% can be placed in a piston die matrix during a piston production method, as embodied by the invention. The placement can include placement against a bracket that mirrors a billet's surface. This placement can result in a lock joint being formed after the piston has been forged under super-plasticity conditions. The bracket surface area S may be determined by the formula:

$$S=KP/\text{Sin } \alpha F,$$

as above.

As another alternative, a billet with silicon, intermetallic particles, and injected hardening particles having an average grain size less than about 15 $\mu m^2$, and comprising a total volume silicon, intermetallic, and injected hardening particles in a range from about 25% to about 60%, can be placed in a piston die matrix against a bracket. The bracket can be formed from a porous ceramic material, such as a porous ceramic material that is infiltrated with an aluminum alloy. The porosity of the porous ceramic material is in a range from about 35% to about 50%. Thus, forging in the piston production method, as embodied by the invention, can be conducted under super-plasticity conditions. The same aluminum alloy composition can used for infiltration of the porous ceramic material as is used in production of a piston case.

After forging steps, a piston that is formed by the piston production method, as embodied by the invention, can be subjected to further deformation. For example, the further deformation comprises deformation in a close-end piston die at a strain rate in a range from about $10^{-5}s^{-1}$ to about $10^{-4}s^{-1}$ for at time in a range from about 0.5 minutes to about 5 minutes. For billet material compositions comprising silicon, intermetallic particles, and injected hardening particles having an average grain size less than about 15 $\mu m^2$, a hardened layer can be deposited on a piston surface. In this scenario, hot deformation forging can be conducted at a temperature of in a range from about 0.9 $T_{melt}$ to about 0.96 $T_{melt}$ and at a strain rate in a range from about $5\times10^{-2}s^{-1}$ to about $10^{-3}s^{-1}$.

The piston production method, as embodied by the invention, can enhance forging conditions in the production of pistons. This enhancing can be conducted by considering a billet's initial microstructure and chemical composition. Experiments reveal that desired forging temperature intervals may be provided to develop desirable mechanical properties. Forging of complex-shaped and large-sized billets can be achieved in the above-described temperature and strain rate intervals, while conducting techniques of disposition of the billet in the piston die, as embodied by the invention.

Pistons, such as simple shaped pistons that are unhardened or without reinforcing elements added thereto, can be employed in low-rated motors. These pistons can be produced from billets by mold casting, in a further piston production method, as embodied by the invention. This piston production method can produce pistons with relatively low manufacturing costs. Casting is the most inexpensive method of billet production. The raw material for mold casting can comprise a course microstructure comprising silicon, intermetallic particles with an average grain size greater than about 15 $\mu m^2$.

For example, silumins comprising this microstructure typically exhibit low levels of plasticity under hot deformation conditions. These Silumins also may exhibit high plasticity at temperatures in a range from about 0.86 $T_{melt}$, to about 0.91 of $T_{melt}$ and at a strain rate in a range from about $10^{-3}s^{-1}$ to about $5\times10^{-5}s^{-1}$. Fine-grained structured silumins, with particles comprising an average grain size less than about 6 $\mu m^2$, may exhibit higher plasticity and may be is acceptable for use in production of complex- shaped pistons and large pistons. If the piston production method comprises pre-forged billets with this microstructure, continuous casting and hot deformation forging can be provided, for example, by a pressing step. A decrease in alloy particle size can permit an increase in a deformation temperature range. The temperature and strain rate at which deformation forging in the piston production method is conducted can influence a silumin material's mechanical properties. These influenced properties can be recognized after the forging step of the piston production method-following any subsequent heat treatment.

The piston production method, as embodied by the invention, can produce pistons from fine grain microstructure alloys. The fine grain microstructure alloys can develop desirable mechanical properties after deformation in a temperature range from about 0.9 $T_{melt}$ to about 0.96 $T_{melt}$, and strain rate in a range from about $5\times10^{-2}s^{-1}$ to about $1\times10^{-3}s^{-1}$. These properties, which are formed in the above-described ranges, can be attributable to a formation of micropores in the billet material near silicon, intermetallic, and injected hardening particles. The micropores can form under high temperature deformation conditions of the piston production method. The micropore size can increase with a decrease in an applied strain rate during the piston production method. This decrease can be attributable to the mechanical properties that are attained at high strain rates, as embodied by the invention.

Conversely, the piston production method can also produce pistons from coarse grain microstructure alloys. It has been determined that coarse drain microstructure alloys can develop desired mechanical properties after deformation at a strain rate in a range from about $10^{-3}s^{-1}$ to about $5\times10^{-5}s^{-1}$. Further, deformation conditions for an billet material composition comprising silicon, intermetallic particles, and injected hardening particles with an average grain size in a range from about 6 $\mu m^2$ to about 15 $\mu m^2$ have also been determined. These deformation conditions comprise deformation at a temperature in a range from about 0.84 $T_{melt}$ to about 0.96 $T_{melt}$ and at a strain rate in a range from about $10^{-3}s^{-1}$–$5\times10^{-5}s^{-1}$.

A fine grain alloy for the piston production method that comprises silicon, intermetallic particles, and injected hardening particles with an average grain size less than about 6 $\mu m^2$ in the billet can be produced by hot deformation of cast billets, in which the cast billets comprise a coarse lamellar grain microstructure. The piston production method conditions for deformation forging of such silicon and intermetallic particles are at a temperature in a range from about 0.79 $T_{melt}$ to about 0.96 $T_{melt}$ and at a strain rate in a range from about $5\times10^{-4}s^{-1}$ to about $5\times10^{-3}s^{-1}$.

The piston production method, as embodied by the invention, can be used to produce pistons, which comprise various compositions, microstructures, and grain sizes, under super-plasticity conditions. For example, and in no way limiting to the invention, pistons comprising brittle materials, for example, eutectic silumins reinforced with hardened particles can be produced by the piston production method, as embodied by the invention. Alternatively, pistons comprising a complex shape and being hardened with low stress-flow materials, which are materials that decrease ring holder deformation and displacement relative to the piston itself, can be formed by the piston production method, as embodied by the invention. As a further alternative. pistons comprising a large size that are stamped by low force presses can be formed by the piston production method.

Super-plastic deformation conditions for the piston production method, as embodied by the invention, may be used with silicon, intermetallic, and injected hardening particles comprising an average grain size that is less than about 15 $\mu m^2$. Further, super-plastic deformation conditions comprise a volume of silicon. intermetallic, and injected hardening particles in a range between about 25% to about 60%. A strain rate in a range from about $5\times10^{-5}s^{-1}$ to about $5\times10^{-3}s^{-1}$, and a deformation temperature in a range from about of 0.88 $T_{melt}$ to about 0.98 $T_{melt}$ can be used as super-plastic deformation conditions for the above-noted grain size.

The piston production method, as embodied by the invention, can forge billets that comprise greater than about 15% by weight of silicon, intermetallic, and injected hardening particles, all of which have an average grain size of more than about 15 $\mu m^2$. Such a billet material composition typically exhibits low levels of plasticity. During the piston production method, contact between the piston billet and piston die matrix's surfaces should occur within about 30% to about 100% of a side surface area, until a piston die-bit contacts a butt end. This contact should prevent at least one of billet cleaving and formation of cracks.

Further, the piston production method should provide a maximum distance between a billet base and piston die matrix base. The distance generally is dependent on a plasticity of the billet material composition, for example, but not limited to at least one of: a quantity and size of silicon, intermetallic, and injected hardening particles; a billet diameter; and a size and shape of the piston die. A shorter distance between the base of a piston billet and base of a piston die matrix can be provided if the billet material composition is brittle. This distance is desired to prevent distortion of the billet as a piston die bit is disposed in the piston die matrix.

The piston production method, as embodied by the invention, can comprise quench-cooling after forging is complete, if a piston has been forged at an essentially same temperature for quenching. This procedure reduces piston production method time since a heating for quenching step will be redundant, and thus can be skipped. Further, an absence of "heating for quenching" can prevent crystal growth in solidifying aluminum of the billet material composition. This procedure may also provide a finer grain microstructure in a final piston.

Ring grooves in the piston can be reinforced in the piston production method for limiting disintegration of piston ring grooves while a motor operates. The ring grooves can be reinforced with metal ring holder, which provide strength at working temperature that is generally is greater than that of the billet material. For example, if a piston is formed as a casting, a ring holder can usually comprise pig-iron that is reinforced by coating formed by molten metal. Alternatively, if a piston is forged, a ring holder can comprise a microstructure including coarse grain silumin with silicon, intermetallic, and injected hardening particles, since silumin typically possesses higher strength characteristics than the piston billet material.

For example, fine grain silumins or intermediate materials with silicon, intermetallic, and injected hardening particles that have an average grain size less than about 15 $\mu m^2$, and that comprise silicon, intermetallic, and injected hardening particles less than about 15% volume can be used in a piston production method, as embodied by the invention. These materials can exhibit plasticity that can enable forging with a ring holder formed from silumins. The silumin can comprise about 20% to about 45% silicon, intermetallic, and injected hardening particles, with silicon, intermetallic, and injected hardening particles having an average grain size greater than about 20 $\mu m^2$.

The ring holder can be placed on the billet, and placed with billet into the piston die matrix. An interference fit can be established between a piston billet surface and butt end sides of the piston die matrix to prevent the blank from cracking. A piston crown can be formed first and enable a ring holder to be located on a billet and avoid deformation. Stress on the billet material is typically lower than that applied to reinforcing ring holder material during any hot deformation treatments. Thus, the reinforcing material will fill a space around the ring holder, in which the ring holder normally undergoes minimal deformation, such as less than about 20%. A piston billet with a "microduplex structure", which means that the billet comprises a billet material composition having a volume content of particles in a range from about 25% to about 60%, can undergo piston production method, as embodied by the invention, under super-plasticity conditions. In this piston production method, forging is conducted with a press and a ring holder experiences less deformation.

A ring holder, which comprises at least one of pig iron and steel, with an average grain size of the silicon, intermetallic, and injected hardening particles less than about 15 $\mu m^2$, an be used with the piston production method to prevent ring holder relocation and avoid ring holder deformation or destruction. To accomplish this prevention, a ring holder can be inserted into a piston die matrix with an interference-fit on the side surface and against butt end surface. The piston crown is forged first followed by the piston inner part under super-plasticity conditions, which simplifies forging.

A reliable joint should be formed between a ring holder and piston in piston production method, as embodied by the invention. Such a joint can be created by piston material filling a ring holder cavity followed by joint deformation. If an oxide film is provided on the ring holder, such as by previous treatments removal of film occurs when the ring holder is placed on the piston blank. Mating surfaces of the ring holder and piston blank can be cone shaped with a conical angle in a range from about 1° to about 10°. The piston and billet ring shoulder can comprise a negative angle in a range from about 1° to about 3°. Further, the ring holder can be pressed with a temperature in a range from about 15° C. to about 540° C. with an interference fit in a range from about 0.1 mm to about 0.2 mm at the diameter. The forging conditions, as embodied by the invention, can produce reliable diffusion joint between the ring holder and piston. The negative angle prevents mating surfaces of the butt end of the ring holder and piston billet from oxidizing during heating and forging. A closed cavity can then form because of different shapes between a lower end of the ring holder and ring shoulder. Additionally, contact of these surfaces with furnace atmosphere is prevented, which can lower piston billet and ring holder oxidation rates during forging.

Further, deformation at the ring holder base and shoulder can occur during forging because of shape differences. The deformation can reduce the oxide film, and in turn, promotes formation of a diffusion joint between the ring holder base and shoulder surface.

Forging a piston with ring holder can be conducted in a two-stage piston production method. First, the billet can be placed butt end against the piston die with its ring groove zone disposed upwardly. A piston die stamps the piston crown that is followed by the ring holder being pressed. The piston blank can then be inverted so the crown now faces downwardly, and a second piston production stage commences with the formation of the piston inner.

The ring holder can be located in the piston die matrix where by an interference fit forms between the ring holder outer surface and piston die matrix inner surface. This disposition can prevent a ring holder from cracking, while the piston is undergoing hot deformation treatment. The disposition can also prevent distorting caused by variations in metal flow rates during formation of the piston inner. The interference fit characteristics can be calculated as follows:

$$1.0017 \leq d/D < 1.0035$$

where d is the ring groove outer diameter at forging temperature and D is the piston die matrix inner diameter at forge temperature.

If an interference fit is less than desired, cracking and distortion of the ring holder may occur. A close interference fit may complicate insertion of the piston billet with ring holder within the piston die matrix. If the piston production method comprises placing a ring holder on a cylindrically shaped billet with very little or no gap therebetween, the piston die matrix can provide enhanced ring holder stability during the piston production method, as embodied by the invention. This orientation can also prevent uneven metal distribution above and below a ring holder. This orientation, in combination with a ring holder position during forging, can provide a stable platform for the ring holder.

Aluminum may be diffusion coated on the ring holder. The diffusion coating at high temperatures can provide the aluminum, for example man aluminum alloy for penetrating the steel ring holder. This procedure may remove oxide films from the aluminum alloy piston and ring holder surfaces. To enhance piston case and ring holder joint reliability, any alloys for example for coatings, used in the piston production method, as embodied by the invention, should possess a similar if not the same coefficient of linear extension.

A two-layer piston configuration, and the piston production method used to form such a two-layer piston configuration, can provide reliable piston performance during initial motor startup. The two-layer piston configuration can also provide enhanced reliability when a motor is hot and under stress. A two-layer piston configuration with high silicon, intermetallic, and injected hardening particle content can provide desired strength characteristics at operating temperatures. However, at low temperatures, such as when a motor is initially started, materials used for the two-layer piston configuration may offer low levels of plasticity. However, a two-layer piston configuration comprising an alloy with low silicon, intermetallic, and injected hardening particle content that has a high plasticity level can offer fatigue resistance.

During motor startup and warning, the two-layer piston configuration can transmit wrist pin forces to a piston inner portion. The piston inner portion can be formed from an alloy comprising low silicon, intermetallic, and injected hardening particles. A motor with pistons formed by the piston production method, as embodied by the invention, during operating can achieve a temperature in the ring groove zone in a range from about 250° C. to about 350° C., and higher if fully stressed. The piston outer case alloy comprises a composition with high content silicon, intermetallic, and injected hardening particles that can prevent at least one of the piston rings from destroying a piston ring groove and piston base from burning out at high operating temperatures.

Variations in a piston thickness can be determined to enhance piston production method characteristics, piston wear resistance, and plasticity. For example, a working temperature while the motor operates around a piston lower edge can be lower than the temperature at a ring groove zone. During cold startup of an engine, a piston skirt lower edge can be subjected to impact stress as the piston moves from top deadcenter through to bottom deadcenter. This stress may cause a piston skirt lower edge to comprise a material with a high plasticity and sufficient resistance to wear. These characteristics can be provided by minimizing a piston outer body thickness. If the plasticity is sufficient for forging, piston billets can be washer shaped (as discussed above) since the shape is conductive to forging. Conversely, if alloy plasticity is insufficient for either forging or pressing, the piston billets can be cup shaped.

Assembling a compound piston billet before forging can facilitate removal of oxide films that coat inner and outer case contact points. The removal may comprise pressing an inner case into an outer case. The exemplary forging steps for producing a diffusion joint may comprise providing a wave-shaped piston billet. The billet shape can be provided by a low weight piston and reinforced ring holder. The ring holder reinforcement blank can also comprise a thin washer placed on the wave-shaped piston billet butt end. After initial forging, this washer also assumes the wave shape. During forging of the piston crown, molten metal from the piston billet can pour between the washers. The molten metal can fill any space between the washers. Moreover, during forging of a blank comprising silicon, intermetallic, and injected hardening particles with an average grain size about 15 $\mu m^2$, a gap free joint I around the ring holder with an interval of: 1/I=4–14 may result. Forging a blank with average grain sized silicon, intermetallic particles, and injected hardening particles with an average grain size greater than about 15 $\mu m^2$ can create a gap free joint with ring holder. The gap free joint I comprises an interval that is determined by 1/I=15–42.

A piston production method that utilizes a washer, as discussed above, can comprise steps of cutting a groove in the washer, for accepting a compression ring. A compression ring is in physical contact with a ring groove and can decrease a ring groove wear rate. A ring holder weight and groove ware rate can be enhanced by a reinforcement washer.

A piston production method, can also comprise attaching a bracket, which is formed of heat resistant material, to a piston case. The attachment can comprise any appropriate means, such as but not limited to attaching by bolts. This bolt attachment step can be time consuming and costly, therefore the piston production method, as embodied by the invention, can comprise attaching brackets to the piston. The brackets can be formed as integral flanges, so the bracket can be attached to a piston without bolts. The formed mechanical joint can be created by a flange surface area, and its orientation relative to a dynamic force generated during motor operation. The joint can overcome inertia within a motor, and thus should be sufficient to hold a bracket and piston case together. Pouring of molten piston material into the bracket cavity during forging in the piston production method, as embodied by the invention, can provide for super-plastic deformation conditions, including those discussed above.

Brackets can comprise porous ceramic materials, which can be infused with aluminum alloy in order to reduce its weight. The ceramic material can comprise an open porosity with a porosity value in a range from about 35% to about 50% to provide frame strength. The infusing of the ceramic material frame with aluminum alloy can be followed by bonding an aluminum layer to a surface, which can mate with the piston case. This bonding step can result in a diffusion joint formed between the bracket and piston case after deformation. If both the infusion material and piston case comprise the same composition, then the formed joint reliability can be enhanced because differences in coefficients of the linear extension have been eliminated. Additional deformation in a close end piston die, for example those exposed to compression from all sides, can be applied under a strain rate in a range from about $10^{-5}s^{-1}$ to about $10^{-4}s^{-1}$ for time period in a range from about 0.5 min to about 5 min. This time period can result in elimination of micropores, which may result in enhanced mechanical properties in the piston.

Wear in the ring groove can be attributed to a decrease in piston alloy strength. The decrease results from exposure to high temperatures during the piston production method. An increase in material strength at the ring groove zone can be provided by plasma welding. The plasma welding comprises melting of material in a ring groove zone often relying on a plasma arc. This plasma welding can be followed by alloying element injection into the melt. However, these steps of material melting and resultant properties are essentially the same for hot deformation and cast pistons. Any differences therebetween may result when fusing steps are used on a piston billet and not used on the piston case.

A fused material may be characterized by large ferrous or nickel-based intermetallic plates, and shrinkage holes. Deformation of the fused material can be conducted while the piston is being forged. The deformed fused material may possess levels of hardness and ultimate strength that often remain the same even after heating to up to temperatures of about 250° C. Any enhanced characteristics in the material can be attributed to a dispersed microstructure as intermetallic particle fragmentation can occur during hot deformation treatments. Further, enhanced characteristics can also be attributed lack of stress points, such as but not limited to shrinkage holes. The absence of shrinkage holes can contribute to an increase in a material's ultimate strength, since the absence can increase the materials' plasticity.

A set of examples of piston production methods within the scope of the invention will now be described. The following operative steps for the piston production method, as embodied by the invention, should not be construed as limiting but merely provide guidance to steps within the scope of the invention. The values set forth below are approximate, unless specified as exact.

A piston blank and piston die can undergo primary heating. Any deformation is conducted under isothermal conditions. The forging temperature is selected dependent on a piston blank initial microstructure and configuration. The billet shape can depend on billet material composition and average grain size of the silicon, intermetallic particles, and injected hardening particles therein. The subsequent heat treatment steps for the piston production method comprises quenching and artificial aging.

EXAMPLE 1

A cylindrical piston billet comprising an approximate alloy composition of 12% Si, 2.2% Cu,. 1.1% Mg, 0.1% Ti, 1.1% Ni, 0.4% Mn, 0.8% Fe, with Al as a balance. The billet was cut from a bar of stock. This bar was made by hot pressing an ingot at 440° C. or 0.86 $T^{melt}$ with a strain rate of 90%$s^{-1}$. $T_{melt}$ for the above alloy is equal to 552° C. and was chosen from a phase diagram for Al- and Mg-based systems. The resulting billet's microstructure comprises globular silicon and intermetallic particles with an average grain size of about 5 $\mu m^2$. The billet was deformed in a piston die system, as in FIG. 1, at 520° C. (0.96 $T_{melt}$) with a strain rate of $1\times10^{-2}s^{-1}$. Quench cooling occurred in water at 20° C. was conducted after the deformation process. Aging was conducted at 210° C. for 10 hours. Microstructural analysis of the material indicated an absence of defects, such as microcracks and micropores. The material had the following mechanical property: σ=390 MPa.

EXAMPLE 2

A piston billet of alloy composition comprising 21%Si, 1.6%Cu, 1.1%Mg, 0.1%Ti, 1.1%Ni, 0.5%Mn, 0.7%Fe with Al as the balance was made by block mold casting. An average grain size of silicon and intermetallic particles is about 120 $\mu m^2$ with lamellar shapes. The billet was tampered to a cone shape with a 4° angle. The billet size was such that when fit into a piston die matrix, which has an inner diameter of 150 mm and a cone angle of 4°, 50% of the surface area made contact with the piston die matrix. A distance from the billet's lower butt end to that of the piston die matrix lower butt end may be determined as:

$$H=dK/C\sqrt{F},$$

where d=150, K=5, C=21, F=120. The distance was calculated at 3.2 mm. The billet was deformed in a piston die system (FIG. 1) at 480° C. (0.91 $T_{melt}$) at an average strain rate of 1x10–4$s^{-1}$. The heat treatment sequence included quenching at 510° C. and aging at 210° C. for 10 hours. The resultant piston was determined to be essentially defect free. Further testing showed that $\sigma_b$=250 MPa.

EXAMPLE 3

A billet with comprising an part was forged at a temperature of 520° C. (0.96 $T_{melt}$) and strain rate of $1\times10^{-2}s^{-1}$ from a cylindrical blank in the piston die system of FIG. 1. The blank was cut from a pressed ingot. The pressing temperature was in a range from about 440 to about 450° C. (0.86 $T_{melt}$ to about 0.88 $T_{melt}$) with a strain of 90%. The ingot composition comprised 12%Si. 2.2%Cu, 1.1%Mg, 0.1%Ti, 0.4%Mn, 0.8%Fe with Al as a balance, and comprised an average grain size of silicon and intermetallic particles about 6 $\mu m^2$. Mechanical treatment to the head of the billet's conical surface with ring, shoulder was conducted to form a cone angle about 6°, and negative shoulder angle of about 3°. A ring holder with a flat lower butt end was formed from aluminum alloy with about a 18% silicon content. The ring holder was pressed into the billet's head using a ring against the shoulder at 20° C.

In this series of above-described steps, a closed cavity was formed between the flat butt end of the ring holder and billet's ring shoulder. The billet with pressed ring holder and can be heated in a furnace to a temperature of 510° C. The billet was fit in a piston die system with simultaneous pressing of the ling holder and forming a piston fire chamber. Forging was conducted under isothermal conditions at 510° C. (0.95 $T_{melt}$) using a hydraulic press with strain rate of $10^{-3}s_{31\ 1}$. After forging the ring holder, the piston was quenched in water and aged at 210° C. for 10 hours. Strength testing revealed the joint between the piston body and ring holder to be 140 MPa.

EXAMPLE 4

A piston blank comprising aluminum alloy with a composition comprising 12%Si, 2.2%Cu, 1.1%Mg, 0.1%Ti, 1.1%Ni, 0.4%Mn, 0.8%Fe, with Al as a balance is used in a piston production method. The alloy comprised an average grain size of silicon and intermetallic particles at 5 $\mu m^2$ and the grains were globular in shape. An aligning protuberance was formed on the piston, and a pig-iron ring holder was installed against the protuberance. The pig-iron ring holder was installed by pressing the ring holder into the protuberance. Prior to its installation on the billet, the ring holder was coated with a layer of aluminum alloy melt, which comprises essentially the same composition as the billet. The billet with ring holder was fit into the piston die matrix with an interference fit therebetween. Forging was conducted under hot deformation conditions at 490° C. (0.93 $T_{melt}$) with a average strain rate of $10^{-3}s^{-1}$. The piston crown was formed first (left side of FIG. 2), and then its inner part (right side of the figure). Subsequently, steps of forging, quenching, and artificial aging were conducted.

An aluminum alloy can be coated on the holder in this example. After cooling, the aluminum alloy coating was fusion joined to the ring groove surface. As the ring holder was pressed into the piston billet, the oxide film coatings from both the piston billet and ring holder surfaces were removed. High temperature and deformation that occur during forging provide conditions for creation of a permanent fusion joint. The strength of this joint is typically sufficient to prevent a gap from developing between the piston body and ring holder during subsequent heat treatment and use.

EXAMPLE 5

An aluminum alloy billet that comprised 12%Si, 2.2%Cu, 1.1%Mg, 0.1%Ti, 0.4%Mn, 8%Fe and Al as a balance, further comprised an average grain size of silicon and intermetallic particles at 12 $\mu m^2$. This billet was formed with an integral shoulder. A butt end surrounding the shoulder was wave-shaped, as described above. The ring holder was made from wave-shaped sheet steel with a thickness of 3 mm. The billet and ring holder wave period was calculated using the formula:

$$L=1(4\text{–}14)$$

where 1 is a thickness of the sheet from which a ring holder was made, for example 3 mm. Using the above-formula above, L is in a range from about 12 mm to about 42 mm. For the experiment, L was about 30 mm. The ring holder was fixed to the blank and placed into the piston die matrix. The piston was then forged. The subsequent heat treatment included quenching and artificial aging.

EXAMPLE 6

A compound piston comprised two cases, an inner and outer case. The billet for the outer case comprised an aluminum alloy with 21%Si. 1.6%Cu, 1.1%Mg, 0.1%Ni, 0.5%Mn, 0.7%Fe, with Al as the balance. It also comprised silicon and intermetallic particles with an average rain size of 30 $\mu m^2$. The inner case billet was formed from an alloy comprising 12%Si. 2.1%Cu. 1.1%Mg. 0.1%Ti, 1.1%Ni, 0.4%Mn, 0.8%Fe and a balance Al, with silicon and intermetallic particles having an average grain size of 5 $\mu m^2$, and being globular in shape. The outer and inner case billets were washer shaped. The piston was forged by simultaneously forging both billets at 490° C. (0.93 $T_{melt}$) with a deformation rate of $10^{-3}s^{-1}$. Subsequent heat treatment sequence included quenching and artificial aging.

EXAMPLE 7

A piston billet body was made from the aluminum alloy with a composition of 12%Si, 2.2%Cu, 1.1%Mg, 0.1%Ti, 1.1%Ni, 0.4%Mn, 0.8%Fe and a balance aluminum. An aluminum alloy piston blank comprised an alloy with a composition of 21%Si. 1.6%Cu, 1.1%Mg, 0.1%T:. 0.5%Mn, 0.7%Fe and a balance of Al. The alloy included an average grain sized of silicon and intermetallic particle of 120 $\mu m^2$. A bracket made from silica mullite with 40% porosity was infused with an aluminum alloy having a same composition as the piston billet. The inner bracket surface was coated with an aluminum alloy layer and had a thickness of 2 mm. The bracket and billet were fit into the piston die piston die matrix and heated to 480° C. (0.91 $T_{melt}$). The deformation was conducted a strain rate of $10^{-4}s^{-1}$. After forging, quench cooling was conducted in open air. Aging was conducted at 350° C. for 8 hours. The joint between piston and bracket was determined to be reliable and permanent.

EXAMPLE 8

A blank cut from hot pressed aluminum alloy rod was formed with a composition of 12%Si, 2.2%Cu, 1.1%Mg, 0.1%Ti, 1.1%Ni, 0.4%Mn, 0.8%Fe, with Al as a balance. The alloy comprised an average grain size of silicon and intermetallic particles of 6 $\mu m^2$ with a globular shape. At a distance of 20 mm from an end, a piston ring section was melted, and injected with a nickel-chrome flux, for example nickel-chrome wire. Melting was conducted using a solid electrode in an argon atmosphere in a three step or 3 turns operation. The first step involved a nickel-chrome flux injection rate of 65 m/hour and a welding speed of 41 m/hour. In second and third steps, welding was conducted without injecting alloying elements, and a welding rate was 25 m/hour. Electric current during the steps was in a range from about 680 A to about 700 A, and the voltage was 220 V. The melt depth was 7 mm.

A billet with a melt layer with a nickel content of 7% and chrome content of 2% was heated in a furnace to 470° C. (0.9 $T_{melt}$). The billet was then placed in a piston die matrix piston die mounted under a hydraulic press.

Billet, joint, and melted layer deformation was conducted with a strain rate of $10^{-3}s^{-1}$. Forging was conducted under isothermal conditions with the blank and piston die temperature at about 470° C. with an average strain rate of $10^{-3}s^{-1}$. The piston was removed from the piston die with the help of a pusher, Quenching was conducted at a temperature of 510±10° C. in water. Aging was conducted at a temperature of 210° C. for 10 hours. During final mechanical processing of the piston the ring groove was formed. No microcracks or micropores were found.

While various embodiments are described herein, it will be appreciated from the specification that various combinations of elements, variations or improvements therein may be made by those skilled in the art, and are within the scope of the invention.

We claim:

1. A piston production method for producing an internal combustion engine piston, the method comprising:

forging a billet from an initial billet comprising an aluminum alloy that comprises silicon, intermetallic particles, and injected hardening particles, the forging is conducted under at least one of super-plasticity and hot deformation conditions;

heat treating the forged billet;

wherein the forging comprises forging at a temperature in a range from about 0.8 $T_{melt}$ to about 0.98 $T_{melt}$ the forging also comprising forging at a strain rate in a range from about $5\times10^{-2}s^{-1}$ to about $5\times10^{-5}s^{-1}$, the piston being formed with a configuration that enables other parts to be connected to the piston, and the initial billet comprises at least one of:

coarse grain silicon, intermetallic particles, and injected hardening particles having at least one of a lamellar, comprehensive shape, and fine grain silicon, intermetallic particles, and injected hardening particles being globular in shape, and the silicon, intermetallic and injected hardening particle volume content is in a range from about 25% to about 60%, and an average grain size of the silicon, intermetallic, and injected hardening particles is less than about 15 $\mu m^2$.

2. A piston production method according to claim 1, wherein the lower strain rate is in a range from about $10^{-3}$–$5\times10^{-5}s^{-1}$ and temperature is in a range from about 0.83–0.89 $T_{melt}$, a particle content greater than 20%, and average grain size greater than 15 $\mu m^2$.

3. A piston production method according to claim 1, wherein the initial billet comprises silicon, intermetallic particles, and injected hardening particles having an average grain size less than about 6 $\mu m^2$, and the forging comprises hot deformation forging that is conducted in a temperature range from about 0.90 $T_{melt}$ to about 0.98 $T_{melt}$ and at strain rate in a range from about $5\times10^{-2}s^{-1}$ to about $10^{-3}s^{-1}$.

4. A piston production method according to claim 3, the method further comprising deformation at a temperature in a range from about 0.79 $T_{melt}$ to about 0.96 $T_{melt}$ and at a strain rate in a range from about $5\times10^{-4}s^{-1}$ to about $5\times10^{-3}s^{-1}$.

5. A piston production method according to claim 1, further comprising deformation forging at a temperature in a range from about 0.84 $T_{melt}$ to about 0.96 $T_{melt}$ and at a strain rate in a range from about $10^{-3}s^{-1}$ to about $5\times10^{-3}s^{-1}$ for billets comprising an average grain size of silicon, intermetallic particles, and injected hardening particles in a range from about 6 $\mu m^2$ to about 15 $\mu m^2$.

6. A piston production method according to claim 1, wherein forging is conducted under super plasticity conditions at a temperature in a range from about of 0.88 $T_{melt}$ to about 0.98 $T_{melt}$ and at a strain rate in a range from about $5\times10^{-5}s^{-1}$ to about $1\times10^{-1}s^{-1}$ for billets comprising an average grain size of silicon, intermetallic particles, and injected hardening particles less than about 15 $\mu m^2$ with a globular shape, and with a volume content of the silicon, intermetallic particles, and the injected hardening particles in a range from about 25% to about 60%.

7. A piston production method according to claim 1, wherein for billets with silicon, intermetallic particles, and injected hardening particles being less than about 15%, billets comprise a tapered cone shape and are set within a piston die matrix in such way that contact of the billet and piston die matrix are in contact at side surfaces, and the contact comprises at least 30% of its area.

8. A piston production method according to claim 7, wherein a distance between a lower butt end and a piston die matrix base equal to h=dK/C√F.

where d is the internal diameter of the bottom of the piston die matrix (mm), C is the silicon content, and intermetallic particles, and hardening particles injected, (% for mass), F is the average area of the silicon, intermetallic particles, and injected hardening particles ($\mu m^2$), and K is a coefficient that factors a shape and size of the upper die, where K is in a range from about 0.5 to about 10.

9. A piston production method according to claim 1, wherein deformation is conducted at a temperature equal to a quenching temperature, and quenching cooling occurs after the deformation for billets comprising silicon, intermetallic particles, and injected hardening particles having an average grain size less than about 15 $\mu m^2$.

10. A piston production method according to claim 1, wherein billets that comprise silicon, intermetallic particles, and injected hardening particles with an average grain size less than about 15 $\mu m^2$, and that comprise less than about 15% silicon, intermetallic, and injected hardening particles, a ring holder can be provided in which the ring holder comprising alloys comprising silicon, intermetallic particles, and injected hardening particles with a size greater than about 20 $\mu m^2$ in a weight range from about 20% to about 40%, and the ring holder being mounted with an interference fit on a piston die matrix surface.

11. A piston production method according to claim 1, wherein billets that comprise silicon, intermetallic particles, and injected hardening particles with an average size less than 15 $\mu m^2$ and a volume of silicon, intermetallic particles and injected hardening particles in a range from about 25% to about 60%, a ring holder comprising silicon particles, intermetallic, and injected hardening particles with an average size less than 20 $\mu m^2$ in a range from about 20% to about 45%.

12. A piston production method according to claim 1, wherein billets comprising silicon, intermetallic particles and injected hardening particles comprise an average grain size less than 15 $\mu m^2$ and that comprises less than 15% silicon, intermetallic, and injected hardening particles, a ring holder made from at least one pig-iron or steel is provided on the piston.

13. A piston production method according to claim 1, wherein a billet having silicon, intermetallic particles, and injected hardening particles comprise less than 15 $\mu m^2$ and a volume of silicon, intermetallic particles, and injected hardening particles in a range from about 25% to about 60%, a ring holder comprises pig-iron or steel is provided on the piston.

14. A piston method production according to claim 12, further comprising forming aligned surfaces of the ring holder and piston's body billet with a conical shape having an angle between about 1° to about 10° and forming a ring-shoulder with a negative angle between about of 1° to about 3°, and the ring holder is placed into the ring-shoulder with the interference fit diameter in a range from about 0.1 mm and about 0.2 mm in diameter, wherein placement of the ring holder is at room temperature.

15. A piston production method according to claim 12, wherein the forging comprises two steps.

16. A piston production method according to claim 12, wherein placement of the ring holder in the piston die matrix comprises placing the ring holder and providing interference fit between the ring holder outer surface and piston die matrix inner surface, wherein the interference fit is calculated by:

$$1.0017 \leqq d/D < 1.0035$$

where d is the ring holder outer diameter at forging temperature, and D is the piston die matrix inner diameter at forging temperature, and forging comprises physically moving the piston die matrix in the direction of forging along with a fixed ring holder during piston crown forging.

17. A piston production method according to claim 12, further comprising coating a ring holder with aluminum alloy.

18. A piston production method according to claim 16, comprising providing the coating and piston case formed from same alloy.

19. A piston production method according to claim 1, the method comprising providing two billets to forge a piston when a billet comprises 15% silicon, intermetallic particles, and injected hardening particles, the billet being used to make piston inner case, with an outer body being mounted with interference fit on a side surface.

20. A piston production method according to claim 1, wherein forging a piston comprises forging from two billets, one billet comprises silicon, intermetallic particles, and the injected hardening particles in a range from about 45% to about 60% by volume to make a piston outer case, and a billet comprising 40% silicon, intermetallic particles, and the injected hardening particles in a range from about 25% to about 40% by volume to make the piston inner case, and during forging the die is heated to a temperature for deformation under super plasticity conditions.

21. A piston production method according to claim 19, wherein the billets are washer shaped.

22. A piston production method according to claim 19, wherein the billets are cup shaped and an outer cup tapered to a butt end.

23. A piston production method according to claim 21, further comprises wherein pressing the inner cup into the outer cup to form a compound billet.

24. A piston production method according to claim 1, wherein the billet comprises a wave shaped protuberance with a wave period L, and a steel washer disposed on the surface, wherein washer has a thickness that satisfies the following condition L/I=4–42, wherein the relationship between a billet height and a shoulder is determined so that the washer is on a same level as a ring groove when forging is complete.

25. A piston production method according to claim 1, wherein a billet comprises silicon, intermetallic particles, and injected hardening particles with an average grain size of less than 15 $\mu m^2$ that is placed in a piston die matrix against a bracket that mirrors the billet's surface, and results in forming a lock joint after the piston has been forged under hot deformation conditions, the bracket surface area S may be determined by:

$$S = KP/\sin \alpha F,$$

where P is a separation force required to overcome the dynamic force created during motor performance, K is a reliability coefficient, F is an aluminum alloy flow resistance at a working temperature, a is an angle between the protuberance and the direction of piston movement.

26. A piston production method according to claim 1, wherein a billet comprises silicon, intermetallic particles, and injected hardened particles with an average grain size less than 15 $\mu m^2$ and a volume content of silicon, intermetallic, and injected hardening particles in a range from about 25% to about 60%, the billet is placed in a matrix against a bracket that mirrors the billet's surface, to form lock joint forming after the piston has been forged from aluminum alloy under super-plasticity conditions, and the bracket surface area S may be determined by:

$$S=KP/\text{Sin } \alpha F,$$

where P is a separation force required to overcome the dynamic force created during motor performance, K is a reliability coefficient, F is an aluminum alloy flow stress at the working temperature, $\alpha$ is an angle between plane of the protuberance and the direction of piston movement.

27. A piston production method according to claim 1, wherein a billet comprises silicon, intermetallic particles, and injected hardened particles with an average grain size less than 15 $\mu m^2$, and a volume content of silicon, intermetallic, and injected hardening particles in a range from about 25% to about 60%, the billet is placed in a piston die matrix against a bracket made from a porous ceramic material infiltrated with aluminum alloy, the porosity of the ceramic frame is in a range from about 35% to about 50%, and forging is conducted under super plasticity conditions.

28. A piston production method according to claim 26, wherein the same aluminum alloy is used for the ceramic frame and piston case.

29. A piston production method according to claim 1, wherein the piston is subjected to further deformation in a close-end piston die at a strain rate in a range from about $10^{-5}$ to about $10^{-4}s^{-1}$ for a time period from about 0.5 min to about 5 min.

30. A piston production method according to claim 1, the method comprises providing billets comprising silicon, intermetallic particles, and injected hardening particles with an average grain size less than 15 $\mu m^2$, and forming a hardened layer a piston surface, conducting hot deformation forging is conducted at a temperature in a range from about 0.9 $T_{melt}$ to about 0.96 $T_{melt}$, and at strain rate in a range from about $5\times10^{-2}$ to about $10^{-3}s^{-1}$.

* * * * *

UNITED STATES PATENT AND TRADEMARK OFFICE

CERTIFICATE OF CORRECTION

PATENT NO. : 6,507,999 B1
DATED : January 21, 2003
INVENTOR(S) : Oscar A. Kaibyshev et al.

It is certified that error appears in the above-identified patent and that said Letters Patent is hereby corrected as shown below:

Title page,
Item [73], please correct the Assignee as follows:
-- General Electric Company,
Schenectady, N. Y. and
Institute Problem Sverkhplastichnosti Metallov RAN Ufa,
Russian Federation --

Signed and Sealed this

Twenty-ninth Day of July, 2003

JAMES E. ROGAN
*Director of the United States Patent and Trademark Office*